(12) United States Patent
Bettale et al.

(10) Patent No.: US 9,769,654 B2
(45) Date of Patent: Sep. 19, 2017

(54) METHOD OF IMPLEMENTING A RIGHT OVER A CONTENT

(71) Applicant: Oberthur Technologies, Colombes (FR)

(72) Inventors: Luk Bettale, Colombes (FR); Michele Sartori, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/283,364

(22) Filed: May 21, 2014

(65) Prior Publication Data

US 2014/0351583 A1 Nov. 27, 2014

(30) Foreign Application Priority Data

May 21, 2013 (FR) ...................................... 13 54552

(51) Int. Cl.
*H04L 29/06* (2006.01)
*H04W 12/04* (2009.01)
*G06F 21/10* (2013.01)
*H04N 21/222* (2011.01)
*H04N 21/414* (2011.01)
*H04N 21/4405* (2011.01)
*H04N 21/443* (2011.01)
(Continued)

(52) U.S. Cl.
CPC ............ *H04W 12/04* (2013.01); *G06F 21/10* (2013.01); *H04L 63/061* (2013.01); *H04L 63/062* (2013.01); *H04N 21/222* (2013.01); *H04N 21/41407* (2013.01); *H04N 21/4405* (2013.01); *H04N 21/4433* (2013.01); *H04N 21/4435* (2013.01); *H04N 21/4627* (2013.01); *H04N 21/63345* (2013.01); *H04N 21/8355* (2013.01)

(58) Field of Classification Search
None
See application file for complete search history.

(56) References Cited

U.S. PATENT DOCUMENTS 7,443,984 B2 * 10/2008 Ishiguro et al. ............... 380/278
7,457,414 B1 * 11/2008 Kahn et al. .................... 380/201
(Continued)

FOREIGN PATENT DOCUMENTS

EP 1 176 827 1/2002

OTHER PUBLICATIONS

Preliminary Search Report dated Feb. 26, 2014 from French Patent Application No. 1354552, pp. 1-2.

*Primary Examiner* — Brandon Hoffman
(74) *Attorney, Agent, or Firm* — MH2 Technology Law Group, LLP

(57) ABSTRACT

Disclosed are methods and systems of implementing a right over a content or contents. Various implementations may include means and operations for receiving, for example in an execution environment and from a secure element, a first key for implementing a right over an encrypted content; decrypting said content in said execution environment with the help of the first key; and implementing the right over the content in said execution environment. Various implementations may also include means and operations for receiving a second key in, for example, said execution environment, from the secure element; and encrypting said content in sad execution environment with the help of the second key.

14 Claims, 4 Drawing Sheets

(51) Int. Cl.
*H04N 21/4627* (2011.01)
*H04N 21/6334* (2011.01)
*H04N 21/8355* (2011.01)

(56) References Cited

U.S. PATENT DOCUMENTS

| | | | |
|---|---|---|---|
| 7,657,033 B2* | 2/2010 | Fiske | H04L 9/0822 380/259 |
| 2006/0109982 A1 | 5/2006 | Puiatti et al. | |
| 2009/0279697 A1* | 11/2009 | Schneider | H04L 9/0637 380/37 |
| 2014/0195809 A1* | 7/2014 | Solow et al. | 713/171 |

* cited by examiner

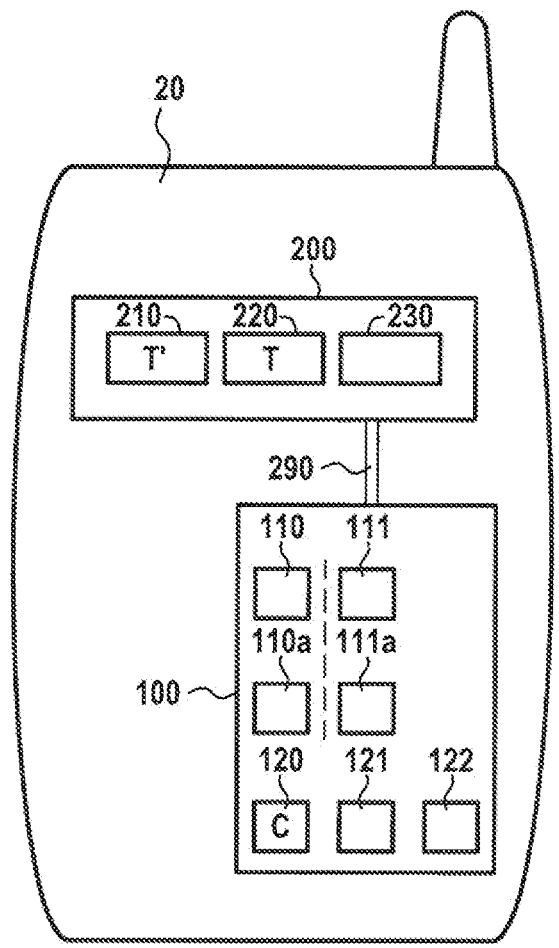

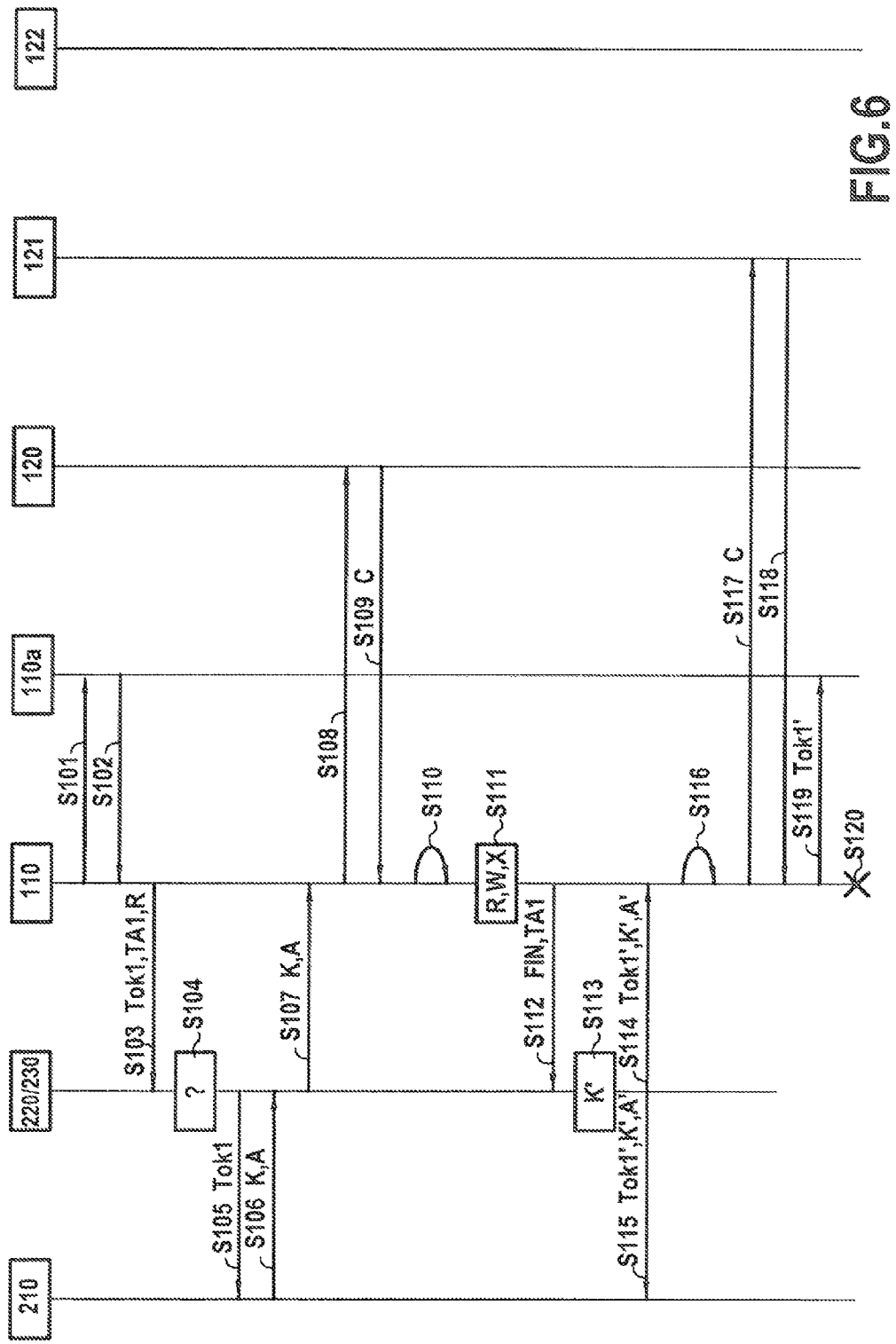

METHOD OF IMPLEMENTING A RIGHT OVER A CONTENT

CROSS-REFERENCE TO RELATED APPLICATIONS

This application claims priority to French Application No. 1354552filed May 21, 2013, the entire disclosure of which is herby incorporated by reference in its entirety.

TECHNICAL CONTEXT

The invention lies in the field of digital security, and in particular managing rights relating to a content to which access is made secure.

Certain information or data, possibly of large size, needs to be made accessible only in secure manner to computer applications or to human users. Access requires a request to be sent by a requester (an application, optionally acting on behalf of a human user) to a controller having a register of rights. It is known to give different rights as a function of the requester, in particular the right to read or the right to modify the data, or the right to execute an application.

Furthermore, in order to use this information or data of large size, referred to as "content", it is necessary to have an execution environment. This environment makes it possible in particular to use peripherals including a screen and a keyboard, and it also makes available a large amount of memory space and a powerful processor.

In order to protect access to the content, the content may be encrypted with a cryptographic key. The cryptographic keys may be stored in secure elements, which are execution environments that often (but nevertheless not necessarily) have resources that are less extensive, in particular a processor of smaller power or a memory of smaller size, in comparison with an execution environment capable of using the content. In contrast, environments for storing cryptographic keys are made secure both in software terms and in hardware terms. They are protected against physical attacks, such as differential power analysis (DPA) attacks. Such an environment is referred to as a secure element. It may be constituted by or included in and implemented by a subscriber identity module (SIM) card, in a component of the embedded secure element (eSE) type constituted by a chipset that is distinct from the main processor of the electronic device, or in a removable component of the secure element (SE) type, e.g. a micro-secure digital (SD) card. A secure element may for example satisfy the specifications of ISO7816 or the Common criteria standard. It may dialog with an execution, environment of the electronic device with the help of Application Protocol Data Unit (APDU) commands and responses.

Typically, the execution environment having greater resources may be a secure execution environment, which means that it is protected in software terms, but it is not protected against physical attacks, in particular because of its complexity.

In order to exercise a right over a content, e.g. in order to execute a trusted application providing a trusted service, to broadcast a piece of music having protected rights, or to gain read or write access to an encrypted content, the user or the application acting on behalf of the user needs to obtain the cryptographic key situated in the secure element, so that the secure element transmits a cryptographic key for decrypting the content in the execution environment.

Since the execution environment is not protected against physical attack, e.g. DPA attacks, the cryptographic key provided by the secure element might then be revealed to attackers carrying out en attack against the secure element.

DEFINITION OF THE INVENTION AND ITS ASSOCIATED ADVANTAGES

The present invention seeks to respond to this problem by proposing a method of implementing a right over a content, the method comprising:
  a reception step of receiving, in an execution environment and from a secure element, a first key for implementing a right over an encrypted content;
  a decryption step of decrypting said content in said execution environment with the help of the first key; and
  an implementation step of implementing the right over the content in the execution environment;
  the method being characterized in that it further comprises:
  a reception step of receiving a second key in said execution environment from the secure element; and
  an encryption step of encrypting said content in said execution environment with the help of the second key.

By means of this method, it is possible to prevent physical attacks, e.g. a DPA attack, revealing a cryptographic key used for encryption, since the key is modified each time the content is used.

The content may be stored in a secure memory of the execution environment, however it may also be stored in a memory of a remote server accessible via a telecommunications network.

A token for identifying the content may be stored in a non-shared zone of secure non-volatile memory of the execution environment. The method may further comprise a reception step of receiving, in the execution environment and from the secure element, a memory address in which the encrypted content is stored. This makes it possible to avoid retaining the address at which the content is stored, thereby increasing security relating to the content.

The invention also provides a trusted computer application comprising instructions that, when executed by a processor, cause a method as described above to be implemented.

The invention also provides a secure element for controlling a content, the element comprising storage means for storing a current cryptographic key associated with an encrypted content, and being characterized in that it further comprises:
  verification and transmission means for verifying a right of a requester relating to said content and for transmitting said current cryptographic key to said requester if said verification is successful; and
  selection and transmission means for selecting a new cryptographic key for encrypting said content once the content is implemented by the requester, and for transmitting the new key to the requester.

By means of this device, it is possible not only to reduce the risks of an encrypted content being read by an attacker using a physical attack, since the keys are modified on each use, but it is also possible to control access to the content by a secure element.

The secure element may further comprise selection means for selecting a new memory zone in a content storage memory of an execution environment in order to store the content once the right is implemented by the requester. This increases security.

According to a particular characteristic, a size of a memory zone in which the content is stored is modified once the right has been implemented.

The invention also provides an electronic device comprising a secure element as described above and an execution environment in which a requesting application can be implemented and the content can be stored.

The invention also provides a method of implementing a right over a content, the method comprising:
- at least one use step of using the content in said execution environment, and before each step of using the content:
  - a reception step of receiving in an execution environment and from a secure element a first referred to as a current key, in order to use an encrypted content; and
  - a decryption step of decrypting said content in said execution environment with the help of the current key;
- the method being characterized in that it further comprises:
  - a reception step of receiving a second key, referred to as a following key, in said execution environment from the secure element; and
  - after each step of using the content, a step of encrypting said content in said, execution environment with the help of the following key, and a step of storing the content in a memory.

The invention also provides a secure element for controlling a content, the element comprising storage means for storing a current cryptographic key associated with an encrypted content, and being characterized in that it further comprises:
- verification and transmission means for verifying a right of use of a requester relating to said content and for transmitting said current cryptographic key to said requester if said verification is successful; and
- selection and transmission means for selecting a new cryptographic key, referred to as a following key, for encrypting said content once the content is used by the requester, and for transmitting the following key to the requester.

LIST OF FIGURES

FIG. 3 shows an electronic device using the principles of the present disclosure.

FIGS. 4 and 5 show tables used in the FIG. 3 device.

FIG. 6 shows a method of implementing a right on a content with the help of a device as shown.

DETAILED DESCRIPTION

Figure 1:
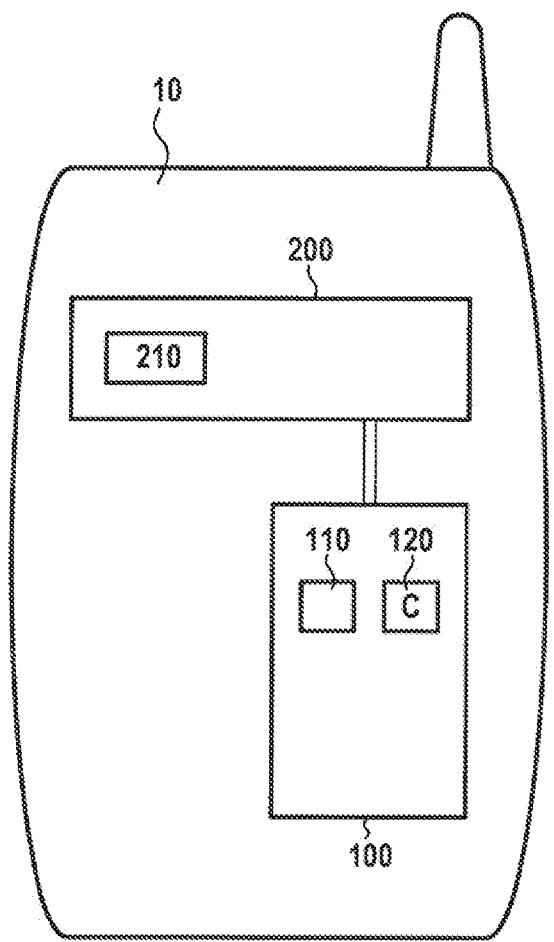
FIG. 1 shows an electronic device using prior art principles.

FIG. 1 shows an electronic device 10, which in this example is a telecommunications terminal, e.g. a mobile telephone. It comprises an execution environment 100 and a secure element 200.

The execution environment 100 includes an application 110 and a content C in a nonvolatile memory zone 120. The content C is encrypted, and the application 110 has software means for performing an operation of decrypting the content C, but it does not have a key enabling the content C to be decrypted also has means for making use of the content C once it has been decrypted, such as for example reading the content C if it is a piece of music protected by rights, or executing the content C if it is an application.

Other applications similar to the application 110 may be present in the execution environment 100, and they have access to the memory zone 120 in which the content C is stored, since this memory zone 120 is a memory zone that is shared between various applications, and may for example be usable with contents of large volume. Contents other than the content C may also be present in the shared memory of the execution environment 100.

The terminal 10 may include other execution environments (not shown) in addition to the execution environment 100. Each execution environment has an operating system under which the applications contained in the execution environment are executed, a processor of its own or shared with other execution environments, enabling the operating system and the applications to be executed, and a memory or memory zone specific to the execution environment.

The secure element 200 has a secure memory zone 210 in which a key K is stored. This key is a permanent key, which is not modified as a function of uses of the content C undertaken by the application 110 or other applications of the execution environment 100.

Communications channels 290 are installed between the secure element 200 and the applications of the execution environment 100, e.g. the application 110. If the execution environment 100 is a secure execution environment, the communications channels 290 are also secure communications channels. A secure execution environment is adapted in particular to executing trusted applications, i.e. applications that provide a guarantee of security to the final human user, such as a payment application.

Figure 2:
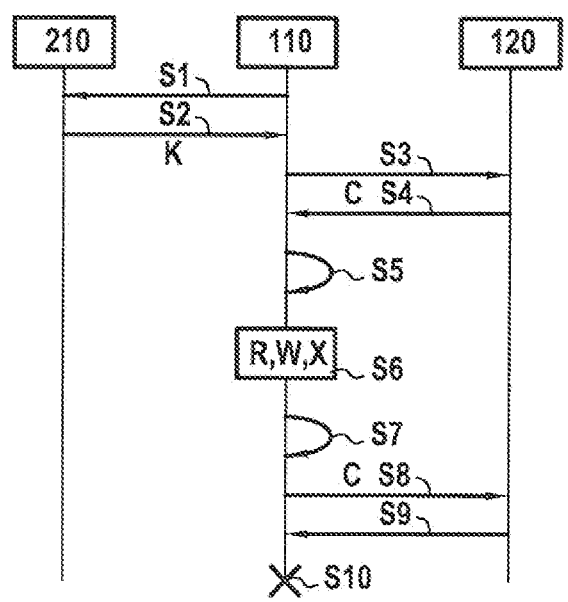
FIG. 2 shows a method of implementing a right on a content using prior art principles.

FIG. 2 shows the steps of a process of using a content C, which process in this example comprises the application 110 reading and modifying the content in application of prior art principles known to the inventors. A first step S1 consists in the application 110 using a communications channel 290 between the secure environment 200 and the execution environment 100 that is associated therewith to access the cryptographic key K that it needs for decrypting the content C.

This is done by the steps S1 and S2. The application 110 extracts the content C from the memory zone 120 in which it is stored (steps S3 and S4), and then decrypts it during a step 95. The application reads the content and modifies it during a step S6, and then re-encrypts it with the key K during a step S7. The application stores it in its modified form in the memory zone 120 (steps S8 and S9), and then deletes the key K from the volatile memory of the execution environment 100 during a step S10. The application 110 will need to look for the key K in the secure element 100 on the next occasion during which it desires to use the content C.

FIG. 3 shows an electronic device 20 constituting an embodiment of the general principles of the present disclosure. It is described with reference to the electronic device 10 of FIG. 1, with identical reference numbers being used for elements that are in common. The electronic device 20 may also be a telecommunications terminal, for example a smartphone or a portable tablet.

Like the device 10, the electronic device 20 has an execution environment 100 implementing applications TA1, TA2, TA3, . . . , and in particular an application 110. The notation TA is short for the term "trusted application", since in an advantageous embodiment, the applications concerned are trusted applications and the execution environment 100 is a secure environment.

The execution environment 100 also stores contents in memory zones that are not volatile, and in particular an encrypted content C in a nonvolatile memory zone 120.

The electronic device 20 also has a secure element 200. The secure element 200 includes a memory zone 210 in which cryptographic keys are stored.

The secure element 200 also includes a control application 220 that is an application developed to be executed with the limited but secure resources of the secure element 200, for example a Java applet or a SIM card applet. Its function is to verify the rights of a requester (a requesting application of the execution environment 100 seeking to use the content C or any other content stored in a nonvolatile memory of the execution environment. This verification may be performed by using a double-entry table T specifying, for each application of the execution environment 100 known to the secure element 200 and for each memory zone of the execution environment 100 in which there is content C to which access is managed by the secure element, the rights of the application over the content.

The table T is shown in FIG. 4, where the applications TA1, TA2, TA3, and TA4 are marked, and in which the memory zones are specified in the form of tokens Tok1, Tok2, Tok3, and Tok4. Read, write, and read-and-execute rights are written R, W, and R/X respectively. The table T is stored in the secure element 200.

As shown in FIG. 5, each of the tokens Tok1, Tok2, Tok3, and Tok4 is associated in a single-entry table T' both with a memory zone A1, A2, A3, A4 (where the term "zone" is used for example to specify a register address and a memory zone size) and also with cryptographic means K1, K2, K3, K4 with which the content stored at the address of the corresponding memory zone that is protected. The cryptographic means may be a symmetric cryptographic key or a pair of asymmetric cryptographic keys. The table T' is stored in the memory zone 210.

The secure element 200 also includes an application 230 for selecting new cryptographic keys and possibly a content address. Selecting a new key may involve generating it, e.g. randomly, or else selecting it from a bank of keys, e.g. a pre-existing bank.

This step of managing the memory may be performed in cooperation with a dedicated application of the execution environment. The application 230 may also be capable of generating a new memory zone address (and an associated memory zone size) in the shared memory of the execution environment 100 for a content, such as the content C, in order to store it in a different memory zone of the memory zone 120. By way of example, this function makes it possible to define memory zones 121 and 122 in the shared nonvolatile memory of the execution environment 100 that are different from the memory zone 120. The addresses and the size of these memory zones are stored in the corresponding rows of the table T'. The application 230 may also decide to increase or decrease the size of the memory zone in which the content is stored, or, without defining a new memory zone for the content C, it may decide to authorize writing over only a portion of the memory zone.

The applications 220 and 230 may constitute a single application, possessing both of the rights-control and the key-selection (or generation) functions, this second function possibly being associated with a function for generating a memory zone address (and size).

The execution environment 100 thus has different memory zones 120, 121, or 122, the content C being stored for example in the memory zone 120. It also has an application 110 (or TA1) that can store as a token Tok1 for the content C in a nonvolatile memory zone 110a that is specific thereto, i.e. a nonvolatile memory zone that is not shared with other applications TA2, TA3.

The application 110 communicates with the controller application 220 and the selection application 230 via a communications channel 290, which may be a secure channel.

FIG. 6 shows the steps of a process of using the content C, specifically reading and modifying the content, by means of the application 110 in accordance with the principles of the disclosure.

A first step S101 consists in the application 110 searching the non-shared memory 120 for the token Tok1 of the content C. This is obtained during the step S102.

Thereafter, during a step S103, the application 110 makes a request to the control application 220 of the secure element 200 for the cryptographic key K needed for decrypting the content C, by sending the token Tok1, and an identifier TA1 enabling the control application 220 to identify the application 110 as the requester, and also the type of rights that it seeks to exercise on the content, e.g. R for reading. In an implementation, a key may also be associated with a particular access right, e.g. read access.

During a step S104, the control application 220 examines the table T or the basis of the information received during the step S103, and if the application 110 is authorized to exercise the right R over the content, it interrogates the memory 210 to extract a key K and a memory address A therefrom (steps S105 and S106).

The control application 220 transmits this key K and address A to the application 110 during a step S107. The application 110 extracts the content C from the memory identified by the address A (steps S108, S109), and then decrypts it during a step S110 with the help of the key K. Thereafter, during a step S111, it reads the content, exercising the right for which it requested the key, and it possibly modifies the content, if it is configured to modify the content.

When the application 110 has finished exercising its right over the content C, it informs the selection application 230 for selecting the key and the address (by transmitting an end signal FIN during a step S112 together with the identifier TA1 of the application 110) which selection application acts during a step S113 to select a new key K' (or a new pair of asymmetrical cryptographic keys) and optionally a new address A', and also a new token Tok1', if there is a new address. It transmits them to the application 110 (step S114). The selection application 230 also stores in the memory zone 210 the new key K' in a new row of the table T' corresponding to the content C as identified by the token Tok1' or by the old token Tok1 if it has not been modified (step S115).

The application 110 encrypts the content C with the key K' during a step S116. Thereafter it stores it in the memory zone 121 (steps S117 and S118). It also stores the token Tok1' in the non-shared memory zone 110a during a step S119 and during a step S120 it deletes the address A' and the key K' from the volatile memory of the execution environment 100.

It is specified that if asymmetrical cryptographic keys are used, then the key transmitted by the secure element during step S107 is the private key and the key transmitted by the secure element during step S114 is the public key.

It is also specified that a new address (and consequently a new token) may be selected on each occasion, or else that selection may be imposed by the secure element or the application 110. The steps from S112 upwards that amount to releasing the content, which content could then be used by another user, may also be imposed by a master function of the execution environment 100. In general manner, the tokens and the keys may be regenerated after each write operation. In the absence of content modification, this regeneration may also be forced by the secure element 200 or by an application of the execution environment 100, e.g. a trusted application of the environment 100, if it is a secure environment (as mentioned below).

In the presently-described example, only one iteration of the steps S101 to S120 of the method is described, this iteration implementing two keys, i.e. the first key K or "current" key and the second K' or "following" key. Nevertheless, the steps S101 to S120 of the method may be repeated. On each new iteration of these steps S101 to S120, the following key of the iteration preceding the new iteration becomes the current key of the new iteration, and a new following key is selected.

Figure 7:
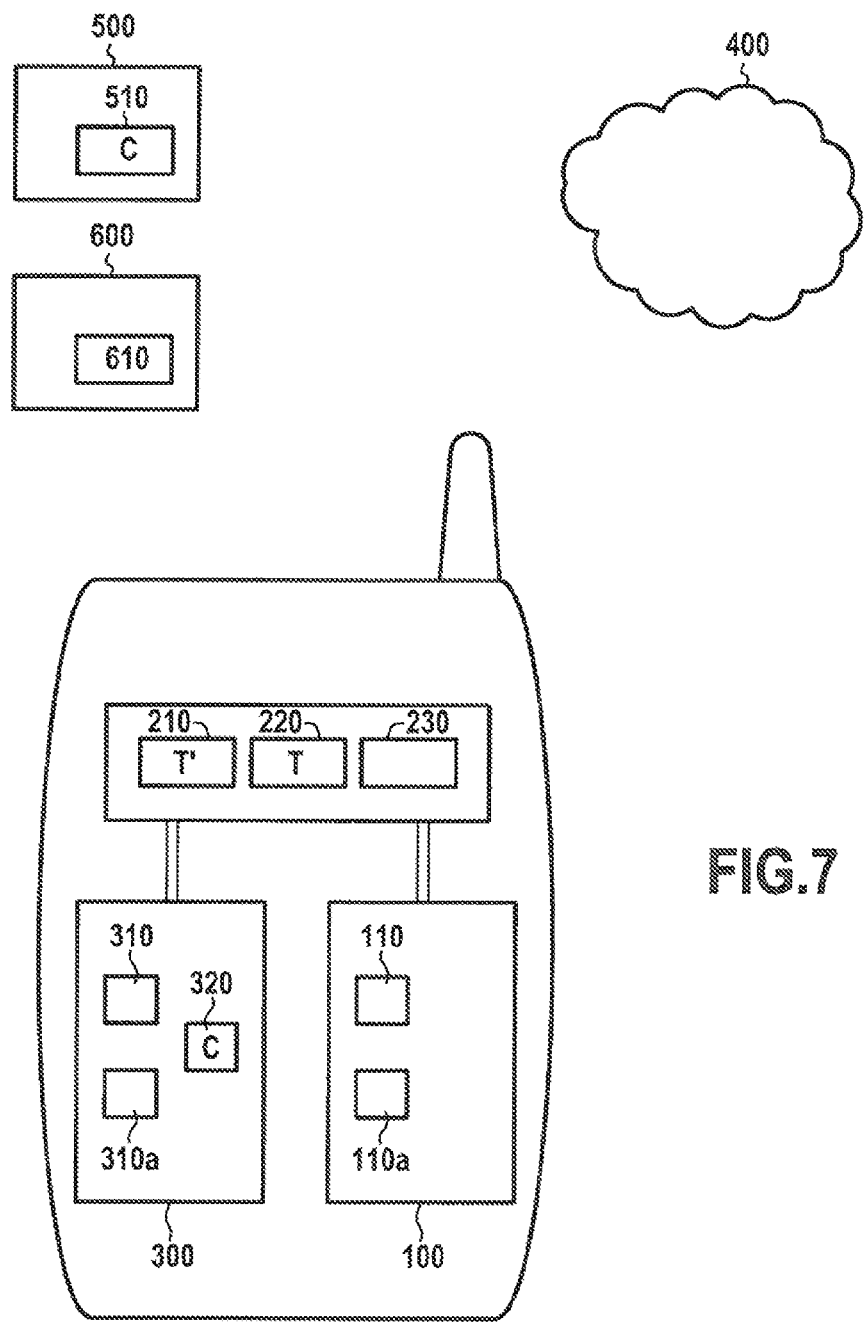
FIG. 7 shows another electronic device using the principles of the present disclosure.

FIG. 7 shows a variant of a device in accordance with the principles of the present disclosure, in which use of the device implements a method in accordance with the principles of the disclosure.

In this variant, the content C is stored in a non-volatile memory 510 of a remote server 500 that is accessible via a telecommunications network 400, which may involve, singly or in combination, wireless technology, e.g. a cell phone telecommunications network or near field communication, or wired technology, e.g. using a protocol such as Ethernet in the Internet. With a wired connection, the remote server may be implemented on a local network and use a connection of the universal serial bus (USB) type (although this is not necessarily the case). The execution environment 100 implements the application 110 which has a non-shared memory zone 110a in which the application 110 stores the tokens for the contents that the application 110 might access. The tokens associated with the content C is associated in the table T' stored in the memory zone 210 of the secure element 200 with an address A in the network 400, such as a universal resource locator (URL) address on the Internet, which address is transmitted with the key K for decrypting or with the key K' for encrypting. As for the memory zones 120, 121, and 122 in the execution environment (FIGS. 3 and 6), the address in the network may be selected after each implementation of a right over the content C. Thus, after the content C has been extracted from the memory 510 of a server 500, it may be stored, with or without modification, in a memory 610 of a server 600 that is likewise accessible via the network 400.

In FIG. 1, two execution environments 100 and 300 are shown. One may be a secure execution environment, e.g. the environment 100, and the other may be a general purpose execution environment, e.g. the environment 300. The secure environment 100 is started when no other execution environment has been started, so as to enable the integrity of the electronic device to be verified. The general purpose environment 300 implements applications from various sources. By way of example, the characteristics of a secure execution environment are listed in the document TEE Protection Profile issued by Global Platform. A secure execution environment implements trusted applications, which, by way of example, have access to all of the functions made available by the main processor and memory of the terminal. Hardware or software protection protects them from applications implemented in the general purpose environment.

The principles of the invention may be implemented in the secure environment 100 or in the general purpose execution environment 300, with contents stored in the storage memory of the corresponding execution environment. Thus, a non-volatile memory zone 320 in the general purpose execution environment 300 may store a content over which the application 310 seeks to exercise a right under the control of the control application 220 of the secure element 200.

Furthermore, when the content is stored in a memory or a server accessible over the network 400, and when both of the applications 310 and 110 seek to exercise a right on the content, an "ongoing session" field is added to the table T' stored in the secure element 200, such that if one of these applications is exercising a right over the content, the secure element 200 does not transmit the key and the address to the other application when it requests them, but waits for the "ongoing session" field to return to a value indicating that the content is free for use, at the end of the ongoing exercise of the right, at which time it sends the address and the key to the requesting application. Other mutual exclusion techniques may be used, such as semaphores, for example.

A mutual exclusion technique may be implemented in similar manner in the architecture of FIG. 3, assuming that a plurality of applications of the execution environment 100, e.g. the applications TA1, TA2, TA3 or TA4 seek to implement rights over the same content.

The invention is not limited to the implementations described, but extends to all variants within the ambit of the scope of the claims.

The invention claimed is:

1. A method of implementing a right over a content, the method comprising:
   a step of sending, from an execution environment and to a secure element, a token for identifying a content that is encrypted and an identifier of a requester associated with the execution environment;
   a step of examining, by the secure element and based on the identifier of the requester, whether the requester is authorized to exercise a right over the content;
   in response to a determination that the requester is authorized to exercise the right over the content, a step of extracting, by the secure element, from a memory of the secure element and based on the token, a first key for using the right over the content and a memory address indicating where the content is stored;
   a first reception step of receiving, in execution environment and from the secure element, the first key and the memory address;
   a decryption step of decrypting said content in said execution environment with the help of the first key and the memory address; and
   a use step of using the content in said execution environment;
   wherein the method further comprises:
   a second reception step of receiving a second key (K') in said execution environment from the secure element; and
   after the use step, an encryption step of encrypting said content, in said execution environment, with the help of the second key.

2. A method of implementing a right over a content according to claim 1, the keys being either symmetric cryptographic keys or asymmetric cryptographic keys.

3. A method of implementing a right over a content according to claim 1, the content being stored in a secure memory of the execution environment.

4. A method of implementing a right over a content according to claim 1, the content being stored in a memory of a remote server that is accessible via a telecommunications network.

5. A method of implementing a right over a content according to claim 1, wherein the token for identifying the content is stored in a non-shared zone of secure non-volatile memory of the execution environment.

6. A trusted computer application embodied in one or more non-transitory computer readable storage media comprising instructions for causing one or more processors to perform a method comprising:
   a step of sending, from an execution environment and to a secure element, a token for identifying a content that is encrypted and an identifier of a requester associated with the execution environment;
   a step of examining, by the secure element and based on the identifier of the requester, whether the requester is authorized to exercise a right over the content;
   in response to a determination that the requester is authorized to exercise the right over the content, a step of extracting, by the secure element, from a memory of the secure element and based on the token, a first key for using the right over the content and a memory address indicating where the content is stored;
   a first reception step of receiving, in the execution environment and from the secure element, the first key and the memory address;
   a decryption step of decrypting said content in said execution environment with the help of the first key and the memory address; and
   a use step of using the content in said execution environment;
   wherein the method further comprises:
      a second reception step of receiving a second key (K') in said execution environment from the secure element; and
      after the use step, an encryption step of encrypting said content, in said execution environment, with the help of the second key.

7. A secure element for controlling a content, the secure element comprising storage means for storing a current cryptographic key associated with an encrypted content and a memory address indicating where the encrypted content is stored, wherein the secure element further comprises:
   reception means for receiving, from an execution environment, a token for identifying the encrypted content and an identifier of a requester associated with the execution environment;
   verification and transmission means for verifying, based on the identifier of the requester, a right of use of the requester relating to said encrypted content and for extracting from a memory of the secure element and transmitting said current cryptographic key and the memory address, based on the token, to said requester when said verification is successful; and
   selection and transmission means for selecting a new cryptographic key for encrypting said encrypted content once the encrypted content is used by the requester, and for transmitting the new cryptographic key to the requester.

8. A secure element according to claim 7, further comprising means for selecting a new memory zone in a content storage memory of the execution environment for storing the encrypted content once the encrypted content is used by the requester.

9. A secure element according to claim 7, wherein a size of a memory zone in which the encrypted content is stored is modified once the encrypted content has been used.

10. A secure element according to claim 7, wherein at least one of the current cryptographic key and the new cryptographic key is a symmetric cryptographic key or an asymmetric cryptographic key.

11. A secure element according to claim 7, wherein the verification and transmission means for verifying the right of the requester concerning said encrypted content and for transmitting said current cryptographic key comprise a double entry table.

12. A secure element according to claim 7, wherein the secure element is included in an electronic device comprising an execution environment in which a requesting application can be implemented and the content can be stored.

13. A method of implementing a right over a content, the method comprising:
   at least one use step of using a content in an execution environment, and before each step of using the content:
      a step of sending, from an execution environment and to a secure element, a token for identifying the content and an identifier of a requester associated with the execution environment;
      a step of examining, by the secure element, from a memory of the secure element and based on the identifier of the requester, whether the requester is authorized to exercise a right over the content;
      when the requester is authorized to exercise the right over the content, a step of extracting, by the secure element and based on the token, a current key for using the right over the content and a memory address of the content;
      a first reception step of receiving, in the execution environment and from the secure element, the current key, and the memory address; and
      a decryption step of decrypting said content in said execution environment with the help of the current key and the memory address;
   wherein the method further comprises:
      a second reception step of receiving a following key in said execution environment from the secure element; and
      after each step of using the content, a step of encrypting said content in said execution environment with the help of the following key, and a step of storing the content in a memory.

14. A secure element for controlling a content, the secure element comprising storage means for storing a current cryptographic key associated with an encrypted content and a memory address indicating where the encrypted content is stored, wherein the secure element further comprises:
   reception means for receiving, from an execution environment, a token for identifying the encrypted content and an identifier of a requester associated with the execution environment;
   verification and transmission means for verifying, based on the identifier of the requester, a right of use of the requester relating to said encrypted content and for extracting from a memory of the secure element and transmitting said current cryptographic key and the memory address, based on the token for identifying the encrypted content, to said requester when said verification is successful; and selection and transmission means for selecting a new cryptographic key, referred to as a following key, for encrypting said encrypted content once the encrypted content is used by the requester, and for transmitting the following key to the requester.

\* \* \* \* \*